April 4, 1950

C. G. PULLIN
HELICOPTER WITH JET REACTION
FOR COUNTERACTING TORQUE 2,503,172

Filed Aug. 16, 1943

INVENTOR
Cyril George Pullin
BY
ATTORNEYS

April 4, 1950

C. G. PULLIN

2,503,172

HELICOPTER WITH JET REACTION
FOR COUNTERACTING TORQUE

Filed Aug. 16, 1943

INVENTOR
Cyril George Pullin
BY
ATTORNEYS

April 4, 1950            C. G. PULLIN            2,503,172
HELICOPTER WITH JET REACTION
FOR COUNTERACTING TORQUE

Filed Aug. 16, 1943            10 Sheets-Sheet 7

INVENTOR
Cyril George Pullin
By Synnestvedt & Lechner
ATTORNEYS

Patented Apr. 4, 1950

2,503,172

UNITED STATES PATENT OFFICE 2,503,172

HELICOPTER WITH JET REACTION FOR COUNTERACTING TORQUE

Cyril George Pullin, Langside, Scotland, assignor to The Cierva Autogiro Company Limited, London, England, a British company Application August 16, 1943, Serial No. 498,796
In Great Britain August 17, 1942

24 Claims. (Cl. 244—17.19)

This invention is for improvements in helicopters of the kind including an airframe, a lifting rotor, and a prime mover mounted in the airframe for driving the rotor. In such a helicopter, the effort of driving the rotor transmits a torque reaction to the airframe. The invention applies to helicopters of this kind having a single rotor in which the airframe is subjected to the whole torque reaction and also to helicopters having more than one rotor, of which the torque reactions do not completely balance one another, so that the airframe as a whole is subjected to a residual torque reaction, being the algebraic sum of the torque reactions of the several rotors.

An object of the invention is to compensate this torque reaction in a more satisfactory way than has heretofore been done or proposed and is achieved by employment of a jet reaction device.

A further object is that of utilising, for the purpose of torque reaction compensation, energy which would otherwise be wasted in the form of cooling loss or/and exhaust heat of the prime mover.

A further object of the invention is the provision of automatic means responsive to the rotor reaction torque for controlling the moment about the centre of gravity of the helicopter of the jet reaction force so as to ensure correct compensation of the rotor reaction torque in all conditions of flight.

Oher objects of the invention include the provision of particular means for generating a stream of energised gaseous reaction fluid for delivery to the jet reaction nozzle (or nozzles) which are preferably placed at the rear end of the airframe, and for transferring waste heat from the cooling system of the prime mover and also from its exhaust gases to the stream of fluid delivered to the jet nozzle(s) for augmenting the final nozzle discharge energy; the provision of particular means for controlling the delivery to the jet nozzle(s) or/and the position and direction of the jet reaction force; means for mixing the exhaust gases with the stream delivered to the jet nozzle(s), together with controllable means for discharging the exhaust to atmosphere when required; the provision of automatic means depending on the revolutions of the rotor or on the operation of the prime mover for ensuring the discharge of the exhaust gases to atmosphere when starting up and optionally when idling; the provision of auxiliary means for utilising the energy of the exhaust gases to increase the final discharge energy of the jet nozzles; and the provision of particular forms of jet reaction nozzle.

How these objects and others, which will hereinafter appear, may be attained, and how the invention may be carried into practice, will be more fully understood from the following description having reference to the accompanying drawings, which illustrate by way of example only a helicopter in accordance with the present invention as defined in the appended claims. Three forms of construction are illustrated of which the first two employ as prime mover a conventional reciprocating internal combustion engine and the third employs an internal combustion turbine. Alternative arrangements in the details of construction are also included in the description and drawings.

These drawings illustrate three alternative embodiments of the invention, the first being illustrated in Figs. 1 to 9, the second in Figs. 10 to 14, and the third in Figs. 15 to 18.

Referring to Figs. 1 to 9, in the helicopter embodying the first form of construction, the airframe includes a body 21 of monocoque construction, having an upward extension 22 supporting the lifting rotor and a tail extension 23, bearing a controllable horizontal stabiliser 24 and rudder 25. The rotor comprises a hub 26 and blades 27; it is connected by a transmission line comprising shafts 28, 29 and a clutch and gears, contained in gear boxes 30, 31, to the prime mover in the form of an air-cooled reciprocating internal combustion engine 32 of the inverted inline type, which is mounted by means of a resilient suspension of conventional type (not shown) on bearers secured to the body structure.

Figure 1:
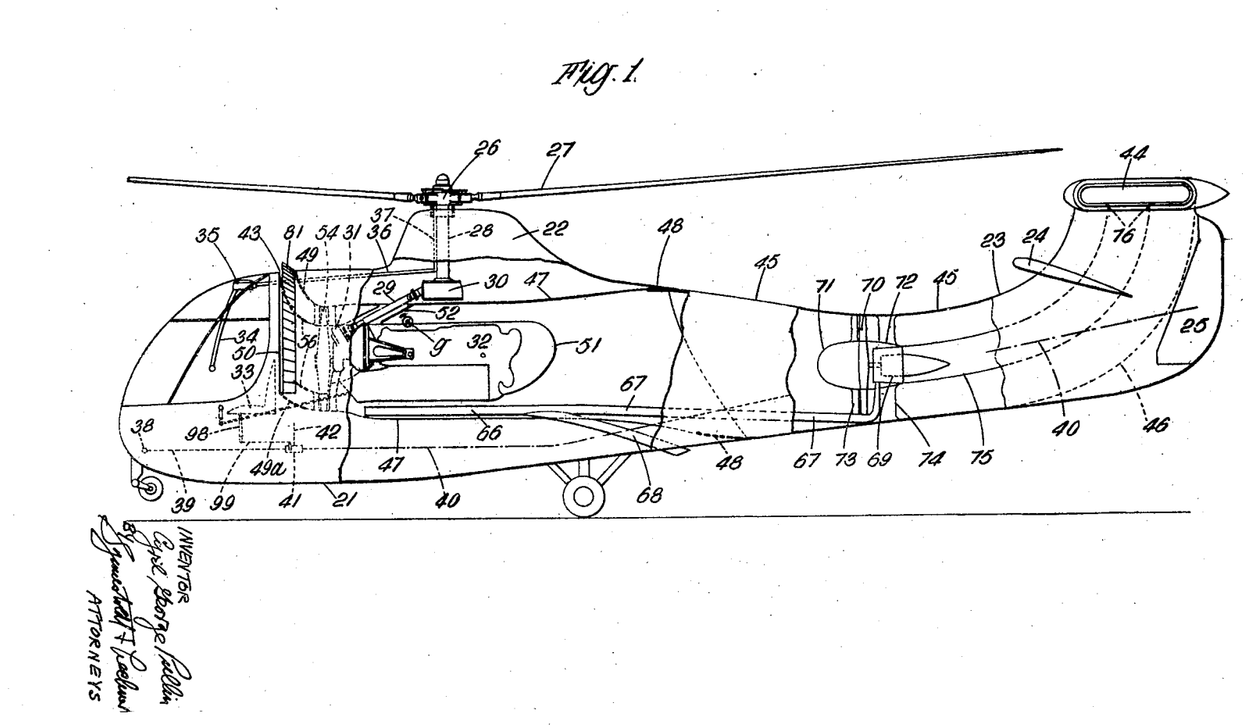
Fig. 1 is a view in side elevation partly in section showing somewhat diagrammatically the general arrangement of a helicopter.
Figure 2:
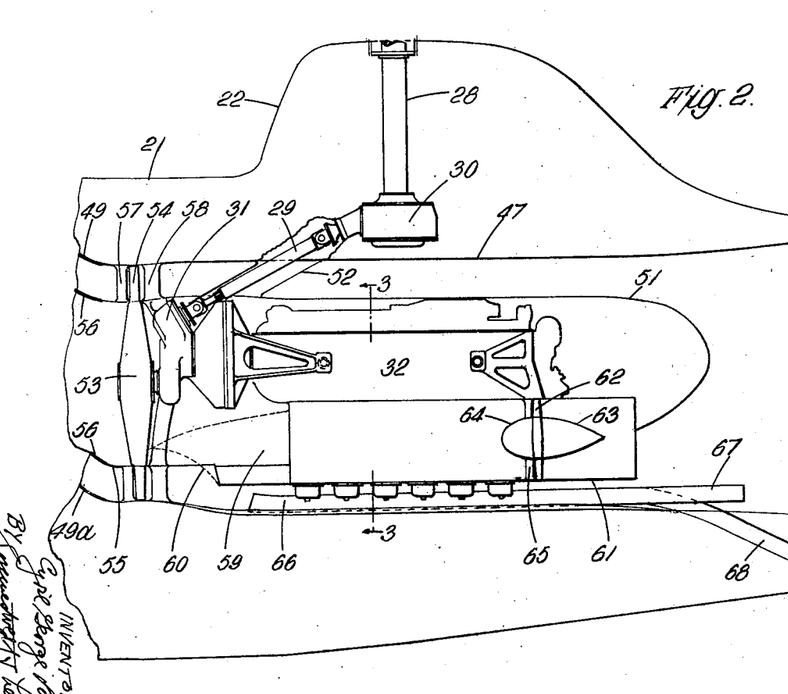
Fig. 2 is a similar view, on an enlarged scale, of the power plant compartment of the helicopter of Fig. 1.
Figure 3:
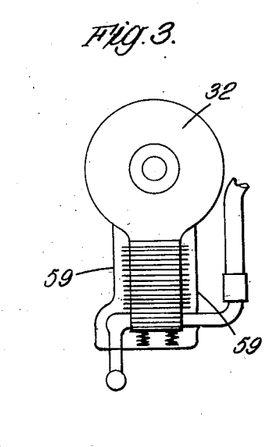
Fig. 3 illustrates a detail of the showing of Fig. 2 taken in section along the line 3—3 of Fig. 2.

The pilot's seat is indicated at 33 and the flying controls comprise a control column 34 of the hanging type connected by members 35, 36, 37 to the rotor axle member (not shown) which is tiltable longitudinally and laterally by movement of the control column.

A rudder bar 38 actuates the rudder 25 by means of conventional connections 39, 40. A forward part 39 and rear part 40 of these control connections are connected to one another inside a control junction box 41 where they are also coupled to connections 42 which actuate means for controlling the yawing moment of the jet reaction as hereinafter described.

Within the body is arranged a continuous duct extending from a semi-annular air inlet 43 situated in the upper part of the body immediately behind the pilot's seat to a jet reaction orifice 44 at the extreme tail of the body. This duct comprises three sections. The walls of the rear section are formed by the actual skin 45 of the body, together with an internal fairing member 46. The central section of the duct is enclosed within an outer tubular wall 47 which is supported directly on the engine 32; as the latter is resiliently mounted it can move relatively to the body and to allow for this movement the rearward end of the duct wall 47 is connected to the body walls 45 by a flexible connection 48. The forward section of the duct is constituted by a flexible wall 49 connected to the forward end of the central section 47 of the duct wall and terminating at the inlet 43 where the upper part of the flexible wall 49 is attached to the body skin and the lower part 49a to a transverse bulkhead 50 behind the pilot's seat. The engine 32 itself is enclosed within a streamlined fairing 51 lying centrally within the duct section 47 so that the duct channel in way of the engine is of annular form. A subsidiary fairing 52 surrounds the transmission shaft 29 and serves to seal off the duct channel from the exterior space at the point where this shaft passes through the duct wall 47.

In front of the engine is mounted a fan-type blower (see Fig. 2) comprising a hub 53 and blades 54. The hub, which is driven by the engine through gears contained in the gear box 31, is shrouded rearwardly by the engine fairing 51 and forwardly by a corresponding fairing 55, the forward end of which is connected to the bulkhead 50 by a flexible extension 56. The blower blades 54 thus lie within the annular duct channel bounded by the outer duct wall and the central fairing, the tips of the blades being closely shrouded by the duct wall 47. A number of stationary guide vanes 57, 58 are arranged respectively in front of and behind the blower blades.

The engine being of the air-cooled type, its cylinders and cylinder heads are enclosed within a casing 59 (see Figs. 2 and 3) of which the right-hand part (remote from the observer as viewed in Fig. 2) terminates forwardly in a scoop 60 which opens into the annular space behind the blower 54; the left-hand part (near the observer as viewed in Fig. 2) terminates rearwardly in a tubular extension 61 opening rearwardly into the duct channel and enclosing an auxiliary fan-type blower 62 driven by the engine through gears enclosed in the rear cover. The hub of the auxiliary blower is shrouded by streamlined fairings 63, 64, and the annular space between the latter and the tubular extension 61 is spanned by a number of radial guide vanes 65 placed immediately in front of the blades of the blower 62, the tips of which are closely shrouded by the tubular extension 61. It will be seen that air for cooling the engine enters the mouth of the scoop 60 under the pressure imparted by the main blower 53, 54, and is sucked through the casing 59 passing between the cylinders and over the cylinder heads from the right-hand to the left-hand side of the casing, being finally discharged from the outlet of the extension 61 into the main duct channel. Owing to the high air resistance of the engine cooling system due to cylinder finning, baffles, et cetera, air which is by-passed through the engine cooling system experiences a greater pressure drop than that which passes along the main duct channel, and the auxiliary blower serves to compensate this differential pressure drop and equalise the internal and external pressures at the outlet of the tubular extension 61.

Figure 4:
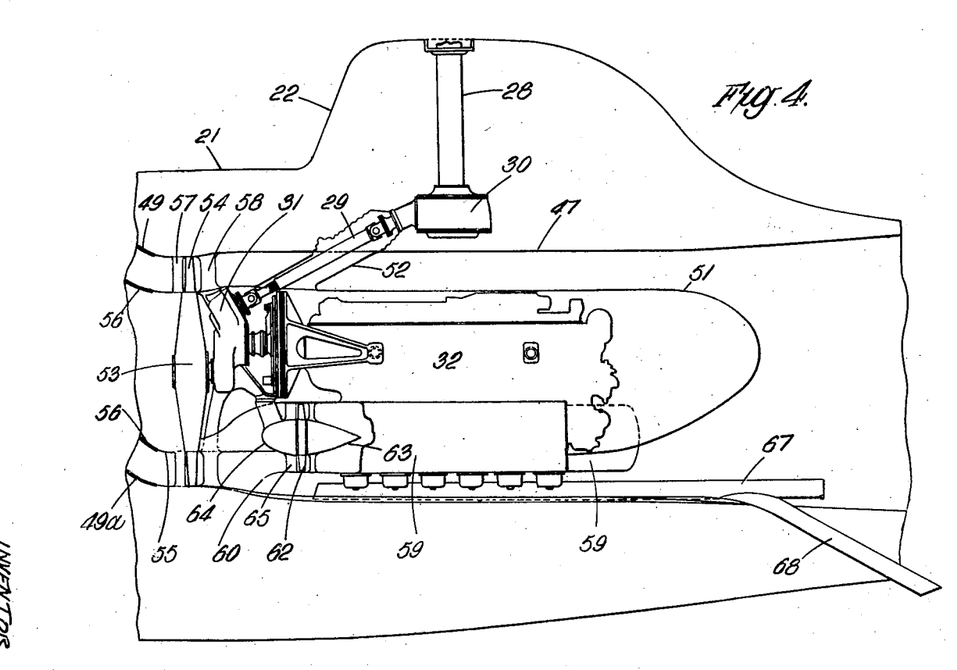
Fig. 4 is similar to Fig. 2, but shows a modified arrangement of certain parts.

Fig. 4 illustrates a modified arrangement in which the auxiliary blower for the engine cooling system is situated in the inlet end of the cooling duct formed by the casing 59, being driven by the engine through gearing housed in the front cover of the engine. In this case the differential pressure drop through the engine cooling system is compensated by further raising the pressure of the cooling air above that imparted by the main blower before it is passed through the cooling system. For normal installations this arrangement is preferable to that of Fig. 2 but it has the effect of further raising the entry temperature of the cooling air and it is therefore only advisable to use this arrangement when the entry temperature of the cooling air is not a critical factor. If this temperature is critical, as for instance in tropical installations, it is better to adopt the arrangement in Fig. 2.

The exhaust from the several cylinders of the engine (see Figs. 2 and 4) is discharged into the manifold 66 which is situated within the main duct. The manifold 66 is continued by an extension pipe 67 with which is connected a branch pipe 68 delivering to the external atmosphere. The extension pipe 67 delivers into an exhaust turbine 69 (see Fig. 1) which is situated in the rear section of the main duct and drives the fan 70 of an auxiliary booster blower of similar construction to the main blower, the turbine and blower hub being enclosed in a two-part streamline fairing 71, 72 carrying stationary guide vanes 73, 74. The exhaust gas, after passing through the turbine, is delivered into a tail duct 75 situated centrally within the main duct and terminating at 76 close to the jet reaction nozzle 44.

An exhaust cut-out for discharging the exhaust direct to atmosphere through the branch pipe 68 is provided and will hereinafter be described in connexion with the control mechanisms of the installation.

Figure 8:
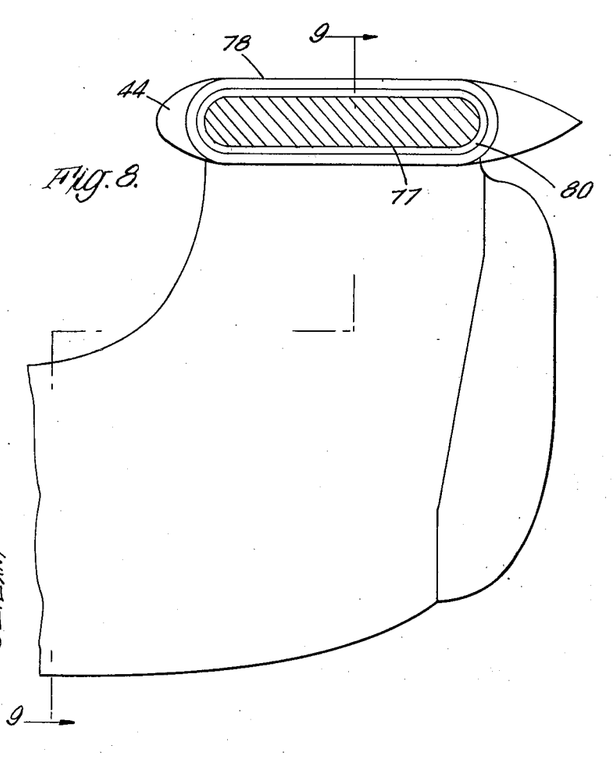
Fig. 8 is an enlarged view in side elevation of the jet nozzle.
Figure 9:
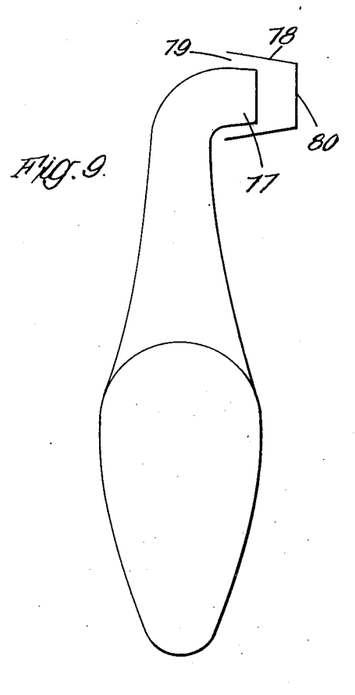
Fig. 9 is a view in section along the line 9—9 of Fig. 8.

The form of the jet nozzle 44 is illustrated in Figs. 8 and 9. In this installation an augmenter type of nozzle is used in which the main duct terminates in a convergent nozzle 77 surrounded by a convergent shroud 78 into which external air is entrained through the opening 79 at the rear and discharged together with the effluent from the nozzle 77 through the jet orifice 80 of the shroud. It will be seen from these figures that the nozzle is of horizontally elongated form and is arranged to discharge transversely of the aircraft in a substantially horizontal direction. The jet reaction of this nozzle, therefore, exercises a yawing moment on the airframe about the centre of gravity and the direction of discharge of the nozzle is selected so that this yawing moment is opposed to the torque reaction imposed by the rotor on the airframe.

The intake of air to the inlet 43 is controlled by means of a ring of adjustable gills 81 (see Fig. 1) and these are controlled by the pilot as hereinafter described. When the gills are in their fully open position, the air inlet to the main duct faces forwardly and upwardly, and being situated beneath the rotor disc, the best advantage is obtained from the ramming effect of the relative external airflow, compounded of the helicopter's forward motion and rotor slipstream velocity, to obtain an initial pressure within the main duct.

The operation of the arrangement is as follows:—Air is drawn in through the gilled inlet 43 into the main duct channel by the action of the main blower 54 by which its head is raised. Part of the air delivered by the main blower is collected by the inlet scoop 60 of the casing 59 and by-passed through the engine cooling system where it serves to cool the engine and receives heat in the process. As this by-passed air after cooling the engine is delivered again into the main duct channel, the heat received thereby is not lost but is retained by the airstream passing along the main duct, thereby increasing its total energy. At the same time heat is transmitted by radiation and conduction from the exhaust pipe 66, 67 to the air passing along the main duct. This gives a further addition to the total energy of the airstream. The total head of the airstream within the main duct is then further raised by the booster blower 70 at the expense of part of the remaining energy of the exhaust gases, after which the main airstream receives a further addition of energy by conduction and radiation from the exhaust gases passing along the tail duct 75. Finally the exhaust gases escaping from the tail duct 75 at its extremity 76 are added to the main airstream whose energy is thus further augmented by the residual energy of the exhaust gases. The latter also serve to increase the volume of the final discharge.

Although this feature is not illustrated, it should be explained that it is preferable to arrange the air inlet for the air intake of the engine carburetter within the main duct on the discharge side of the main blower so that the head imparted by the latter is utilised to increase the engine boost.

It will be seen that the final discharge energy of the jet reaction nozzle is derived in part from the power absorbed in driving the main blower and in part at the expense of the waste heat losses of the engine, and that the energy represented by the latter is almost wholly conserved and utilised in producing the jet reaction. Some loss must of course occur through irreversible heat drops at certain stages and through external radiation, but the latter is minimised by lagging the duct walls 47 and by applying a heat insulating covering to the rear part 45 of the body skin.

Figure 5:
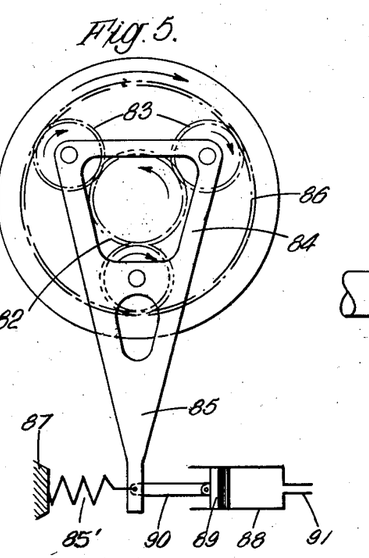
Figs. 5 to 7 are diagrammatic views of details of control mechanisms.
Figure 6:
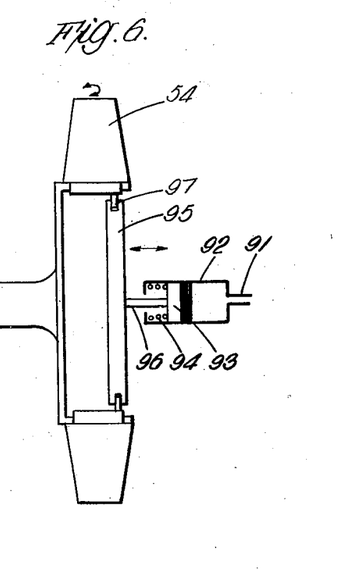
Figure 7:
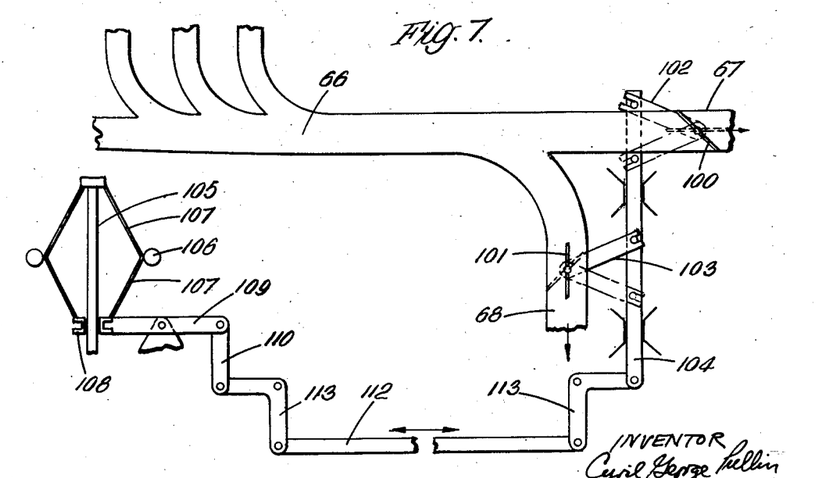

In order to obtain correct compensation of the rotor torque reaction with varying power input and conditions of flight, use is made of a torque balance mechanism. The torque balance mechanism is shown in Fig. 5 and is preferably housed within the gear box 30. Referring to Figs. 1 and 5, the transmission shaft 29 drives a sun wheel 82 (through any suitable gearing) and the sun wheel is in mesh with planet wheels 83 carried by a planetary cage 84 terminating in a torque balance arm 85. The planetary wheels 83 mesh in turn with an internal annulus on ring gear 86 mounted on the lower end of the transmission shaft 28 extending up to the rotor (see Fig. 1). The sun wheel 82 therefore drives the annulus 86 and shaft 28 in a reverse direction through the planet wheels 83 (as shown by the arrows in Fig. 5), and also at a reduced R. P. M., and the reaction torque is transmitted by the torque balance arm 85 through a compression spring 85' to a fixed anchorage 87 within the gear box 30. The displacement of the arm 85 against the spring 85' is thus a measure of the torque reaction sustained. In order that this displacement may be utilised to control the compensating reaction of the jet nozzles 44, the torque balance arm 85 is connected to the transmitter unit of an hydraulic remote control system, the essential features of the transmitter unit being a cylinder 88 and piston 89, the latter being connected by a link 90 to the torque balance arm 85 and the cylinder being in communication with a pipe line 91. The other end of the pipe line 91 (see Fig. 6) communicates with a cylinder 92 of a receiver unit containing a piston 93 loaded by a spring 94. This receiver unit is connected to mechanism for varying the pitch of the blades 54 of the main blower. The pitch varying mechanism is illustrated diagrammatically in Fig. 6 in the form of a sliding collar 95 connected to the piston 93 of the receiver unit by means of a rod 96 and engaging eccentric pins 97 secured in the roots of the blower blades 54. It will be seen that axial displacement of the collar 95 will cause the pitch of the blades 54 to vary. It must be understood that the arrangement thus diagrammatically shown in Fig. 6 is only intended in an illustrative sense, appropriate mechanisms for varying the pitch of fan blades being well known to those skilled in the art.

The torque reaction of the rotor as measured by the compression of the spring 85' (see Fig. 5) is utilised to govern the delivery of the main blower 54 and thereby the volume and energy of the nozzle discharge in such a way that the rotor torque reaction is correctly compensated in all conditions of flight.

It will be noted that the jet nozzle 44 is placed above the centre of gravity of the aircraft indicated at $g$ (see Fig. 1). The reason for this is as follows: It must be remembered that even when the yawing moment of the jet reaction exactly compensates the torque reaction of the rotor, the lateral force represented by the jet reaction, if uncompensated, will cause side-slip. To compensate this lateral force, it will be necessary to tilt the axis of the rotor in the transverse vertical plane sufficiently to produce an equal and opposite lateral force, but unless the axis about which the rotor axis is tilted passes through the centre of gravity of the helicopter, which is not constructionally convenient, the lateral force produced by the rotor will give rise to a rolling moment which must be compensated by setting the jet reaction nozzle(s) an appropriate distance above the centre of gravity of the helicopter to produce an equal and opposite rolling moment.

Regulation of the main blower delivery can also be utilized for controlling the aircraft in yaw when in vertical flight or hovering. In these conditions the rudder 25 has no effect as the helicopter then has no "steerage way." Control of the blower delivery by the pilot may be provided by connecting to the cylinder 92 of the hydraulic control receiver unit (Fig. 6) a second pipe line (not shown) similar to 91. This second pipe line is in turn connected to a second transmitter unit (not shown) similar to 88 et cetera, the piston of which is actuated by the connection 42 shown in Fig. 1 whereby movement of the rudder bar 38 actuates the pitch changing mechanism of the blower blades by means of the hydraulic transmission shown in Fig. 6 so as to regulate the jet nozzle discharge and thereby obtain appropriate control in yaw.

However, in the preferred arrangement, the pilot's yawing control in vertical and hovering flight is obtained by regulating the intake of air to the duct by means of the gills 81, the control connections 42 being coupled either direct or through a servo-mechanism of any convenient known type to the conventional mechanism which regulates the opening of the gill ring.

When the helicopter is in high speed forward flight and under control in yaw by the rudder 25, the pilot can render his control of the blower blade pitch inoperative by means of a hand-lever 98 and link 99 (see Fig. 1) which operate a disconnecting device of an appropriate type (not shown) housed within the control box 41 whereby the control connection 42 is disconnected from the rudder control connections 39, 40.

The exhaust branch pipe 68 controlled by a cut-out is provided to enable the exhaust of the engine to be discharged direct to atmosphere when starting up because of the possibility of the presence of unburnt fuel in the exhaust manifold and consequent fire risk if the exhaust were discharged internally. The cut-out mechanism is diagrammatically illustrated in Fig. 7 and comprises butterfly valves 100 and 101 located in the exhaust extension pipe 67 and branch pipe 68 respectively. These butterfly valves are actuated by levers 102, 103 which are slotted to engage pins carried by a sliding bar 104, the levers being so disposed that when one butterfly is open the other is closed.

To provide automatic control of the exhaust cut-out a rotor-connected governor is provided. This is diagrammatically illustrated in Fig. 7 and comprises a governor spindle 105, driven by gearing (not shown) from any convenient point of the rotor transmission, flyweights 106, links 107, and a sliding collar 108 actuating a lever 109 connected by links 110, 112 and bell-cranks 113 to the sliding bar 104. This illustration is intended to be entirely diagrammatic and in actual practice the linkage connecting the governor to the sliding bar 104 will be of a more complex nature as required by each particular design and will preferably include a servo-mechanism for augmenting the power of the governor. The detail design of such devices, however, is well known to those skilled in the art.

The second embodiment of the invention, to which Figs. 10 to 14 refer, differs from the first embodiment described above (a) in respect of the arrangement of the main blower and auxiliary cooling blower with respect to the engine, (b) by the omission of the exhaust turbo booster blower, (c) in respect of the control devices, and (d) in the form and construction of the jet nozzles. In other respects, the helicopter is similar to that already described, the general arrangement being similar to that illustrated and described above with respect to Fig. 1.

Figure 10:
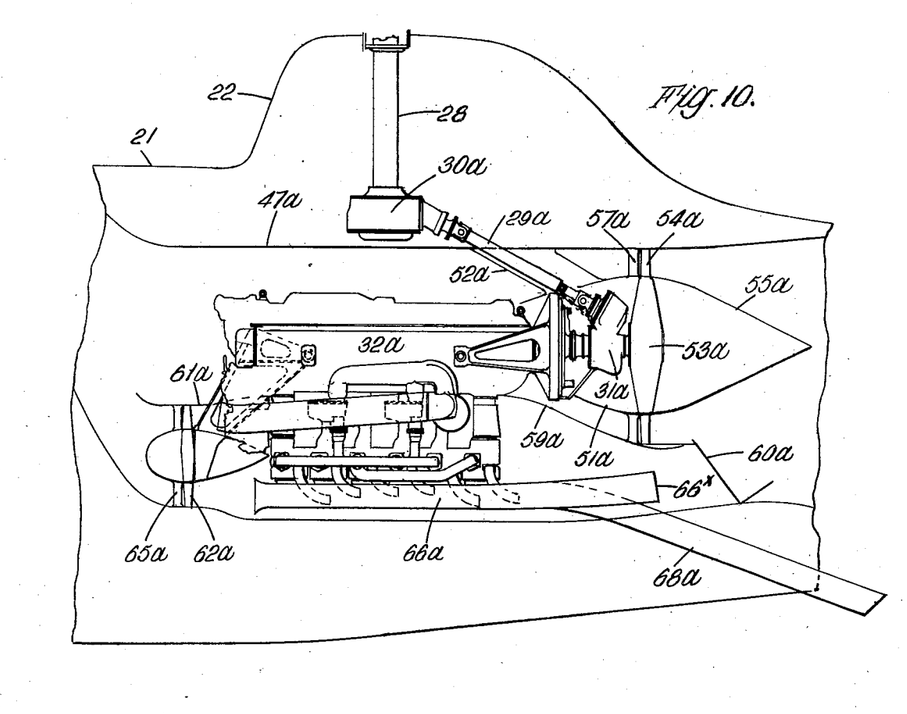
Fig. 10 is a view similar to Fig. 2 showing an alternative arrangement.

With regard to the arrangement of the engine and blowers, Fig. 10 may be referred to. The various parts shown in Fig. 10 have their counterparts in Fig. 2, and are indicated by the same reference numbers in both figures, those in Fig. 10, however, being distinguished by the suffix a. Referring to Fig. 10, it will be seen that the engine 32a is similar to the engine 32 of Fig. 2 but is placed the other way round, the gear box 31a from which the main blower 53a, 54a is driven being at the rear. This gear box also houses the gears driving the oblique rotor transmission shaft 29a which enters the rotor gear box 30a from the rear. As before, the engine is enclosed within the centre section 47a of the main duct and in this case the central fairing 51a which shrouds the front of the blower hub 53a only encloses the gear box 31a, the greater part of the crankcase of the engine being directly exposed to the airstream within the main duct channel. The central fairing 55a shrouding the rear part of the blower hub 53a corresponds to the forward fairing 55 of Fig. 2. As before, a fairing 52a extending from the central fairing 51a to the outer duct wall 47a encloses the oblique shaft 29a. In the arrangement of Fig. 10 only one set of stationary guide vanes 57a are provided, being situated in front of the blower blades 54a. As before, engine cooling air is by-passed through the cooling duct formed by the casing 59a analogous to the casing 59 of Fig. 2, but in this case the tubular extension 61a housing the auxiliary blower 62a and stationary guide vanes 65a is at the front, and the cooling by-pass duct 59a discharges at the rear into the main duct channel through an opening 60a. In this respect the arrangement is analogous to the modification shown in Fig. 4.

The auxiliary blower 62a being situated at the upstream end of the cooling by-pass duct, the air in the engine cooling system is under the pressure imparted by the auxiliary blower, but as the intake for the latter is on the suction side of the main blower, the pressure above atmosphere of the air at entry to the auxiliary blower is only that attributable to the ramming effect obtained at the main air intake 43 (see Fig. 1), and since the outlet 60a of the by-pass cooling duct is situated on the pressure side of the main blower 54a, the capacity of the auxiliary blower 62a must be greater than that of the auxiliary blower in the previous example as it must overcome the pressure difference between the upstream and downstream sides of the main blower as well as the pressure drop attributable to the air resistance of the engine cooling system. On the other hand, the capacity of the main blower will be somewhat less than in the previous example because it has a somewhat smaller volume of air to deal with since the air by-passed through the engine cooling system does not pass through the main blower.

In this example, as in the previous one, the engine exhaust is discharged into the manifold 66a which, however, in this instance, discharges at 66x directly into the outlet of the cooling by-pass duct. In this way the exhaust gases exercise an ejector effect which assists the auxiliary blower 62a in maintaining circulation of air through the by-pass cooling duct. Except for the small amount of heat radiated and conducted from the surface of the exhaust manifold 66a to the air in the by-pass cooling duct, the energy of the exhaust is directly transmitted to the airstream in rear of the blower system and is thus conserved and contributes to the final discharge energy of the jet nozzles.

Figure 11:
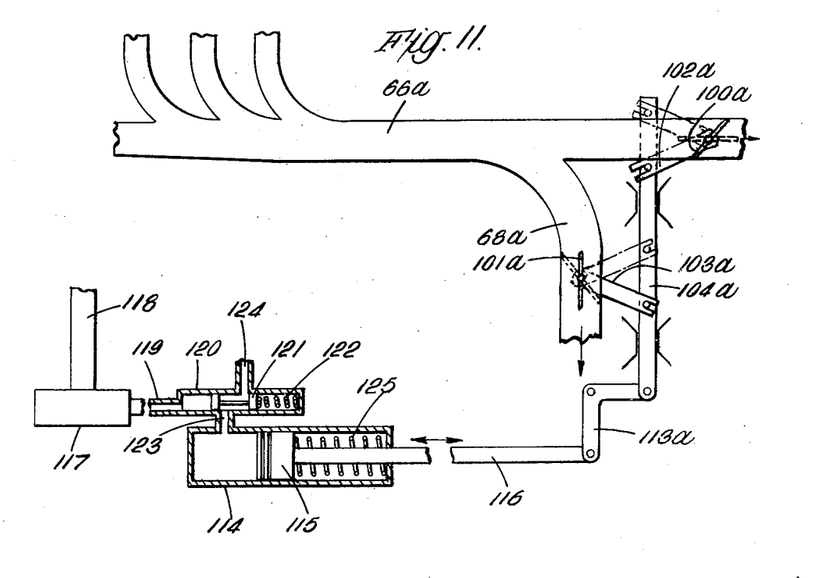
Fig. 11 is a view similar to Fig. 7 showing an alternative arrangement.

As before, an exhaust branch pipe 68a delivering direct to atmosphere is provided, the discharge of exhaust to atmosphere being regulated by a cut-out mechanism similar to that previously shown but having a different type of control illustrated in Fig. 11. Referring to Fig. 11, the cut-out mechanism as before comprises butterfly valves 100a, 101a, levers 102a, 103a, sliding bar 104a, and bell-crank 113a. In this case, however, the mechanism is actuated by an hydraulic cylinder 114 and piston 115, connected by a link 116 to the bell-crank 113a. The oil pressure for operating the piston 115 is supplied by a pump indicated in outline at 117 whose spindle 118 is driven by the engine 32a, being connected at any convenient auxiliary drive point. The pump 117 delivers through a pipe line 119 to a valve box 120 enclosing a sliding piston valve 121 loaded by a spring 122. The valve box 120 communicates by means of a channel 123 with the cylinder 114 and with a drain pipe 124. The oil pressure in the cylinder 114 is balanced by a spring 125 which serves to return the piston 115 when the oil pressure is released. It will be seen that the pressure in the pipe line 119 depends on the delivery of the pump 117 which in turn depends on the revolutions per minute of the engine. As the pressure in the pipe line 119 increases, the piston valve 121 is moved to compress the spring 122, and when it has moved far enough to uncover the channel 123, the oil pressure is transmitted to the cylinder 114 and throws the piston 115 over against the pressure of the spring 125, thus actuating the cut-out to close the butterfly 101a and open the butterfly 100a, thereby diverting the exhaust gases from the atmospheric pipe 68a to the outlet 66x (see Fig. 10).

Similarly when the engine revolutions fall, the piston valve 121 is thrown over by the spring 122, thus putting the cylinder 114 into communication with the drain pipe 124 and releasing the pressure in the cylinder, allowing the spring 125 to return the piston 115 and throw over the butterfly valves to discharge the exhaust to atmosphere. The engine revolutions at which the exhaust cut-out comes into operation can be selected by an appropriate setting of the tension of the valve spring 122, for which purpose a spring adjuster of any convenient known type (not shown) may be provided. This arrangement ensures that when starting up the engine, and when idling, the exhaust is discharged to atmosphere, the cut-out being automatically closed to discharge the exhaust into the main air duct when the engine revolutions exceed an appropriate selected value. It should be stated that the type of control described above is only one of many possible alternatives; in fact, any type of control which ensures the discharge of exhaust gas to atmosphere when the engine is being started up, or when idling, may be used; for instance, the cut-out mechanism may be directly connected to the engine throttle lever in such a way that the exhaust is discharged to atmosphere when the throttle opening is less than a selected amount.

With regard to automatic control for regulating the jet reaction to obtain correct compensation of rotor torque reaction in different conditions of flight, an alternative method is employed in the second embodiment selected for illustration and description with reference to Figs. 10 to 14. In this case, control is effected not by varying the pitch of the main blower blades, which remains fixed, but by varying the angular setting of the stationary guide vanes 57a (see Fig. 10) which are adjustably mounted for this purpose so as to throttle to a greater or less extent the intake of the blower 53a, 54a.

Figure 12:
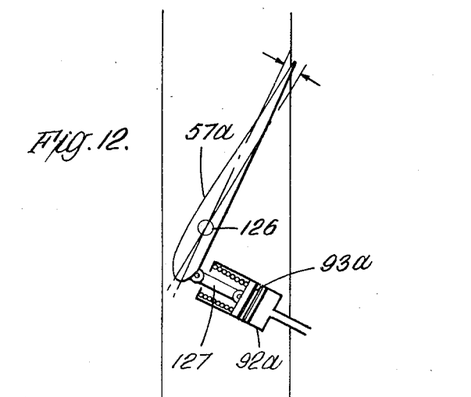
Fig. 12 is a diagrammatic view of a control mechanism alternative to that shown in Fig. 6.

As before, a torque balance mechanism and hydraulic transmitter unit as illustrated in Fig. 5 are employed, but the receiver unit is connected to a mechanism for varying the setting of the guide vanes 57a. An arrangement for this purpose is diagrammatically shown in Fig. 12 showing one guide vane 57a adjustably mounted on a spindle 126 and connected by means of a link 127 with the piston 93a of an hydraulic receiver 92a. In this illustration the vane 57a may be considered as a master vane, the other vanes, which are not shown, being connected thereto by an appropriate linkage so that all the vanes are operated simultaneously.

Figure 13:
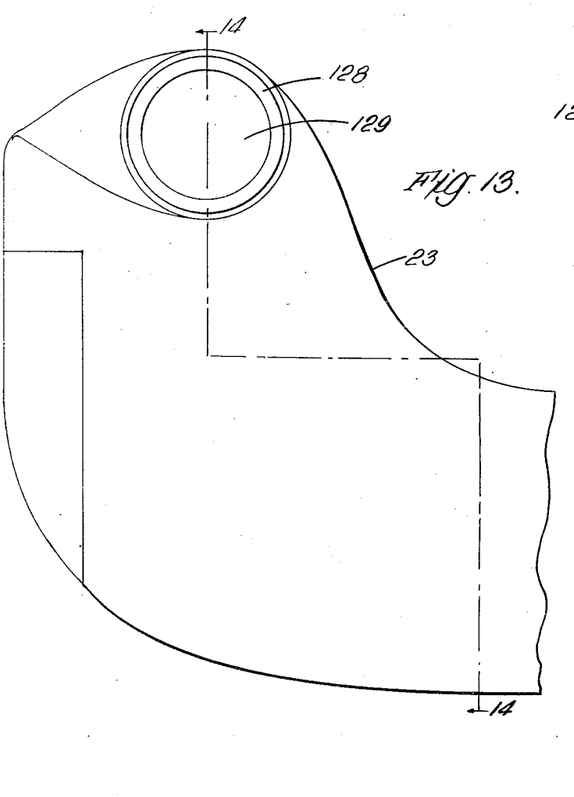
Figs. 13 and 14 are views similar to Figs. 8 and 9 respectively showing an alternative arrangement, Fig. 14 being in section taken along the line 14—14 of Fig. 13.
Figure 14:
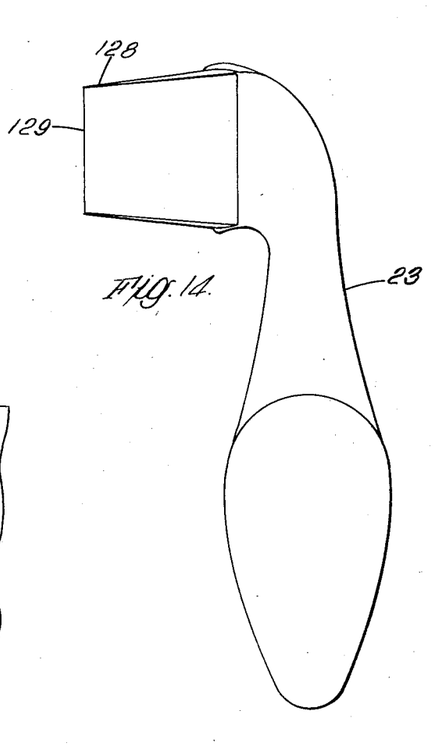

This embodiment exemplifies a simple type of jet reaction device as illustrated in Figs. 13 and 14 employing a single convergent nozzle member 128 having a circular orifice 129 arranged at the extremity of the tail portion 23 of the body of the helicopter.

In the third form of construction of the invention selected for description as illustrated in Figs. 15 to 18, the prime mover is of the internal combustion turbine type. The general arrangement of the helicopter is similar to that shown in Fig. 1, and parts shown in Figs. 15 to 18 which correspond to similar parts shown in Figs. 1 to 9, are indicated by the same reference numbers but distinguished by the suffix b.

Figure 15:
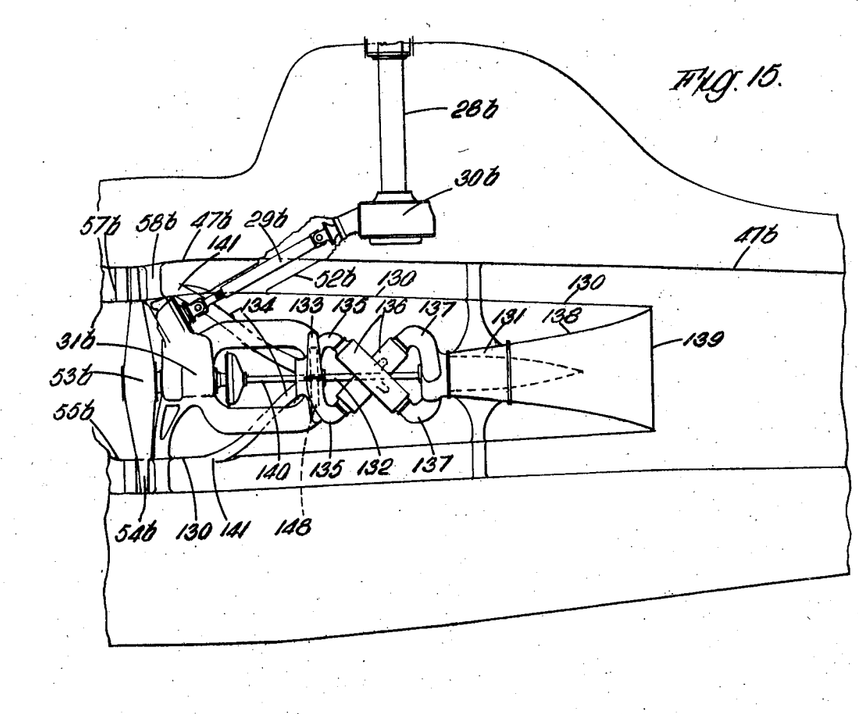
Fig. 15 is a view similar to Fig. 2 of another alternative arrangement.

Referring to Fig. 15, a fairing 130 centrally situated within the central section 47b of the main duct encloses the internal combustion turbine and associated mechanism. The turbine comprises a rotary air compressor, combustion chambers, a turbine rotor, and a main driving shaft. The turbine rotor is contained within a housing 131 and is secured to the main shaft 132 which carries a rotor 148 of the air compressor contained within a compressor housing 133. The compressor housing communicates with air intake trunks 134 and delivers through pipes 135 to a pair of combustion chambers 136 which are provided with fuel injection devices and ignition devices (not shown). The combustion chambers communicate in turn through trunks 137 with the housing 131 of the turbine rotor which exhausts into a tubular duct 138 of divergent section discharging at 139 into the main duct 47b. A forward extension 140 of the driving shaft 132 carries a blower comprising a hub 53b and fan type blades 54b which span the duct space between the duct walls 47b and the central fairing 130. The profile of the central fairing 130 is continued in front of the blower 53b, 54b by means of a fairing 55b corresponding to the fairing 55 of Figs. 1 and 2. As in the previous examples, stationary guide vanes 57b, 58b are arranged in front of and behind the blower blades 54b. The shaft extension 140 passes through a gear box 31b within which are arranged a clutch and gears providing a driving connection between the shaft extension 140 and the oblique rotor transmission shaft 29b which is enclosed within a fairing 52b and drives the main rotor shaft 28b through gears contained in a rotor gear box 30b. The air intake trunks 134 open at 141 into the main duct channel on the pressure side of the blower 53b, 54b so that the intake pressure of the rotary compressor of the turbine is that imparted by the blower 53b, 54b which thus assists the rotary compressor in building up the compression pressure at entry to the combustion chambers 136. Thus air for combustion in the turbine receives a partial compression in passing through the blower 54b et cetera, is collected at the intakes 141 and delivered through the trunks 134 to the compressor casing 133 where it is further compressed by the compressor 148 and delivered through the pipes 135 into the combustion chambers 136 in which fuel injection and ignition takes place; the products of combustion are expanded in the outlet end of the combustion chambers and in the pipes 137 and the expanded gases are then passed through the turbine rotor in the casing 131 driving the shaft 132, being finally exhausted through the divergent duct 138 and issuing into the main duct at 139, where they are mixed with the excess air delivered by the blower 53b, 54b through the duct channel bounded by the outer duct wall 47b and the inner fairing 130. The total effluent is then delivered through the rear section 45 et cetera of the main duct (see Fig. 1) to the jet reaction nozzles.

In this form of construction, automatic control of the compensation of rotor torque reaction is obtained by varying the characteristics of the jet-nozzle discharge. As in the embodiment already described, a torque balance mechanism, together with a transmitter unit of remote hydraulic control as illustrated in Fig. 5, is employed, the receiver unit being located adjacent the jet nozzles and connected to mechanism for varying their discharge characteristics.

Figures 16, 18:
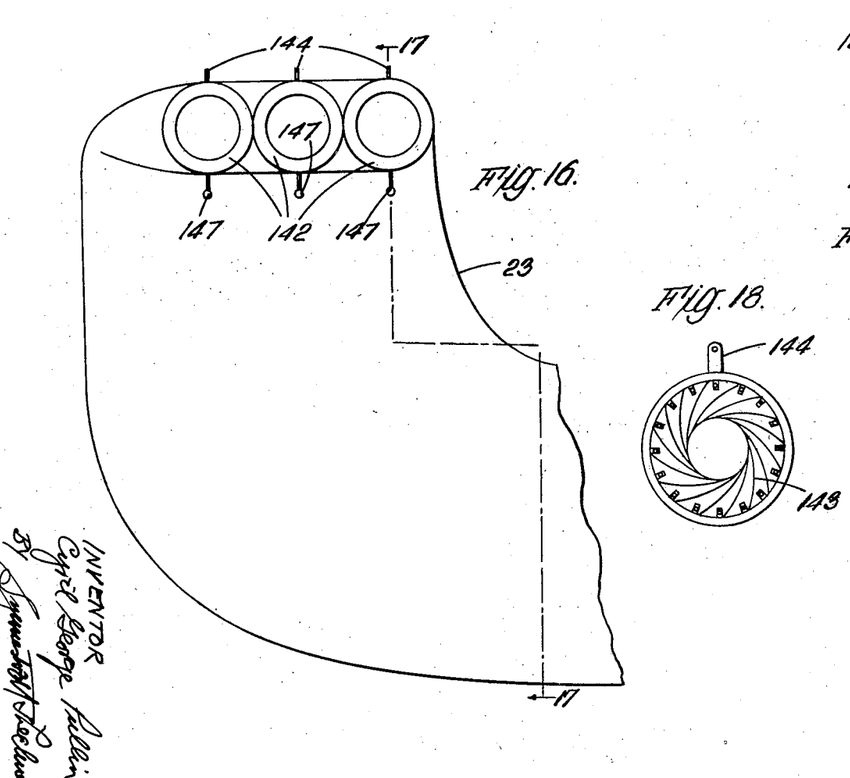
Figs. 16 and 17 are views similar to Figs. 8 and 9 of another alternative arrangement, Fig. 17 being in section taken along the line 17—17 of Fig. 16.
Fig. 18 is a detail view taken in section along the line 18—18 of Fig. 17.
Figure 17:
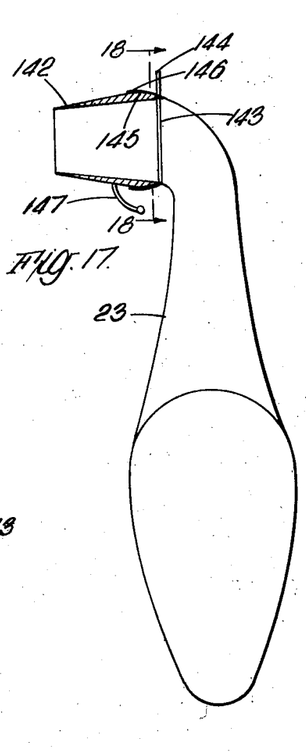

The arrangement of the jets is illustrated in Figs. 16 to 18. The extremity of the tail portion 23 of the body carries three jets 142 disposed in a fore-and-aft horizontal row. These jets are of the simple convergent type as shown more particularly in Fig. 17. At the base of each jet nozzle is arranged an iris diaphragm 143 controlled by a lever 144. These iris diaphragms act as valves controlling the discharge from the jet nozzles. By operating all three iris diaphragms simultaneously the total discharge can be varied. Furthermore, by differential operation of the iris diaphragm valves, the centre of effort of the total jet reaction can be shifted horizontally in a fore-and-aft direction. For instance, by opening the iris diaphragm valve of the forward jet nozzle to its fullest extent and closing the iris diaphragm valves of the other two jet nozzles, the jet reaction is exercised at the centre of the forward nozzle, whereas by closing the two forward nozzles and opening the rear one, the jet reaction line is displaced to the centre of the rear nozzle. If the discharge is confined to the centre nozzle, or if all three nozzles are in operation and equally throttled, the jet reaction passes through the centre nozzle.

In addition, the base of each jet 142 has an external spherical face 145 supported in a fixed jet holder 146 having an internal spherical seating. The jet nozzles are free to move to a limited extent on their spherical seatings, and this provides a means of varying the direction of the jet discharge. To effect this, each jet 142 is provided with a lever 147. By deflecting all three nozzles in the horizontal plane by operation of the levers 147, the yawing moment of the jet reaction about the center of gravity of the helicopter can be varied.

The way in which the levers 144 actuating the iris diaphragm valves and the levers 147 actuating the deflection of the nozzles are operated by remote controls will depend to a large extent on various factors associated with particular designs but in one preferred arrangement the levers 144 are connected to the receiver unit of the hydraulic remote control actuated by the torque balance mechanism and the levers 147 are linked together so as to give equal and simultaneous deflection of the nozzles and connected by a remote control means of any convenient type to the connections 42 (see Fig. 1) which are selectably controllable by the rudder bar 38 as already described. In this way control in yaw by the pilot in vertical or hovering flight is obtained by swivelling the jet nozzles on their spherical seatings and compensation of the rotor torque reaction in varying conditions of flight is obtained by automatic regulation of the iris diaphragm valves.

The receiver unit of the hydraulic transmission is not illustrated, being similar to those shown in Figs. 6 and 12, and the mechanical linkages connecting the receiver unit to the levers 144 in such a way as to provide continuous variation of the yawing moment of the jet reaction from zero when the rotor torque reaction is zero, up to a maximum when the rotor torque reaction is a maximum is not illustrated, the design of appropriate mechanical linkages for this purpose being within the competence of those skilled in the art.

What I claim is:

1. In a helicopter having an airframe, a prime mover mounted on the airframe, and sustaining rotor means which when driven impose a substantial unbalanced torque reaction on the airframe, blower mechanism on said airframe, said rotor means and blower mechanism being both coupled to said prime mover to be driven conjointly thereby, said prime mover having a heat-transferrent relation to the blast of the blower mechanism, and jet nozzle means powered by the blast of said blower mechanism and so disposed on the airframe as to compensate said unbalanced torque reaction, by which arrangement adequate torque compensation, in appreciable part secured by such transfer, to the blast of otherwise wasted heat, is assured whenever said rotor means are driven by the prime mover.

2. A construction as claimed in claim 1, whose prime mover is an internal combustion engine and including a turbo-blower driven by the exhaust of said engine and operating on the stream of gaseous reaction fluid between the first-mentioned blower and the jet nozzle to augment the nozzle discharge energy.

3. A construction as claimed in claim 2, together with reaction fluid interheater means supplied with waste heat from the internal combustion engine and arranged between the first-mentioned blower and the turbo-blower.

4. The construction of claim 1, wherein there is duct structure, for conveying the blast to the nozzle means, which serves also as part of the air-frame structure.

5. The construction of claim 1, wherein the configuration of the nozzle means is such as to provide a horizontally-elongated discharge area.

6. The construction of claim 5, wherein the location of the jet nozzle means is such that the said discharge area is disposed closely adjacent to the lower limit of the path of movement of the rotor in the vicinity of said discharge area.

7. In a helicopter having an airframe, a prime mover mounted on the airframe, and sustaining rotor means which when driven impose a substantial unbalanced torque reaction on the airframe, blower mechanism on said airframe, said rotor means and blower mechanism being both coupled to said prime mover to be driven conjointly thereby, said prime mover having a heat-transferrent relation to the blast of the blower mechanism, jet nozzle means powered by the blast of said blower mechanism and so disposed on the airframe as to compensate said unbalanced torque reaction, by which arrangement adequate torque compensation, in appreciable part secured by such transfer, to the blast, of otherwise wasted heat, is assured whenever said rotor means are driven by the prime mover, and control means for varying the yawing moment imparted to the airframe by the heated blast of the jet nozzle means, whereby the approximate counteraction of rotor driving torque by the heated jet blast may be varied for accurate yaw control.

8. The construction of claim 7 wherein said control means comprise automatic mechanism responsive to the torque reaction of the sustaining rotor means.

9. The construction of claim 7 wherein said control means are constructed and adapted to regulate the discharge of the blast from the jet nozzle means.

10. In a helicopter, an airframe, a lifting rotor, an internal combustion engine supported within the airframe and driving the lifting rotor, a jet reaction nozzle situated at the rear of the airframe for compensating the torque reaction of the lifting rotor on the airframe, a continuous duct extending from an air inlet at the fore-part of the airframe to the jet nozzle, a blower driven by the engine for forcing a stream of air along said duct from the inlet to the jet nozzle, means for cooling the engine, and by-pass duct means for bleeding part of the air from the stream within said continuous duct, passing it through the said cooling means and returning it to the continuous duct, whereby variations in power delivered to the rotor are automatically accompanied by variations in the same sense in waste heat energy from the engine delivered to the jet nozzle.

11. The construction of claim 10, wherein the engine cooling means is situated on the suction side of the blower.

12. The construction of claim 10, wherein an auxiliary blower is located in the by-pass duct means for compensating the differential pressure drop due to the additional drag of the cooling means.

13. In a helicopter, an airframe, a lifting rotor, an internal combustion engine supported within the airframe and driving the lifting rotor, a jet reaction nozzle situated at the rear of the airframe for compensating the torque reaction of the lifting rotor on the airframe, a continuous duct extending from an air inlet at the fore-part of the airframe to the jet nozzle, a blower driven by the engine for forcing a stream of air along said duct from the inlet to the jet nozzle, and means for transferring energy from the exhaust of the engine to the airstream within the duct before delivery to the jet nozzle whereby waste heat energy powering the jet is automatically varied in the same sense as driving energy powering the rotor.

14. A helicopter construction, as claimed in claim 13, wherein the prime mover is resiliently mounted in the airframe and the continuous duct comprises a part supported on the engine and enclosing the blower, and other parts supported on the airframe, together with flexible connections ensuring continuity between the engine-supported and airframe-supported parts of the duct.

15. In a helicopter having an airframe, a lifting rotor, and an internal combustion engine supported within the airframe and driving the lifting rotor, a jet reaction nozzle situated at the rear of the airframe for compensating the torque reaction of the lifting rotor on the airframe, a continuous duct extending from an air inlet at the fore-part of the airframe to the jet nozzle, a blower driven by the engine for forcing a stream of air along said duct from the inlet to the jet nozzle, and an exhaust collector receiving exhaust gases from the internal combustion engine and having an outlet discharging said exhaust gases into the duct conveying the stream of air delivered by the blower whereby waste heat energy powering the jet is automatically varied in the same sense as driving energy powering the rotor.

16. In a helicopter as claimed in claim 15, the provision of a controllable exhaust cut-out enabling exhaust gas to be discharged direct to atmosphere.

17. The construction of claim 15, together with automatic control means responsive to the rotational speed of the rotor for operating the exhaust cut-out to discharge exhaust gas to atmosphere when the said rotational speed does not exceed a selected value.

18. The construction of claim 17, together with engine-connected automatic control means for operating exhaust cut-out to discharge the exhaust gas to atmosphere when starting up.

19. In a helicopter, an airframe, a lifting rotor, a prime mover supported in the airframe and driving the lifting rotor, said prime mover comprising an internal combustion engine of the turbine type including an air inlet, a rotary compressor, a combustion chamber provided with fuel and ignition devices, and a turbine rotor driving the compressor as well as the lifting rotor; together with a duct terminating in a jet reaction nozzle for compensating the rotor torque reaction on the airframe, and means for discharging the exhaust gases of the turbine in the said duct whereby waste heat energy powering the jet is automatically varied in the same sense as driving energy powering the rotor.

20. In a helicopter, an airframe, a lifting rotor, a prime mover supported in the airframe and driving the lifting rotor, said prime mover comprising an internal combustion engine of the turbine type including an air inlet, a rotary compressor, a combustion chamber provided with fuel and ignition devices, and a turbine rotor driving the compressor as well as the lifting rotor; together with a continuous duct extending from an inlet at the fore-part of the airframe and terminating in a jet reaction nozzle for compensating the rotor torque reaction on the airframe, a blower driven by the turbine and situated in said duct for forcing a stream of air along the duct to the jet nozzle, and means for discharging the exhaust of the turbine into the duct at a point between the blower and the jet nozzle whereby waste heat energy powering the jet is automatically varied in the same sense as driving energy powering the rotor.

21. A helicopter as claimed in claim 20, wherein the air inlet of the turbine is arranged within the duct on the pressure side of the blower to receive air whose head has been raised by the blower.

22. In a helicopter having a lifting rotor and a prime mover for driving the same, the combination of a jet reaction device oriented to counteract rotor torque and positioned toward the tail of the helicopter, and energy-salvaging means powering said jet, said means including: a duct associated with the prime mover and extending from thence to the jet reaction device adjacent the tail, said duct having an air intake for delivery of cooling air to the prime mover; and a blower driven by exhaust gases from the prime mover and delivering to said jet; whereby both radiated heat and exhaust heat from the prime mover are utilized to provide a power input to the jet reaction device which automatically varies in the same sense as the power input to the rotor.

23. A helicopter construction, as set forth in claim 22, in which the air intake is positioned to receive down draft from the rotor as well as relative flight wind.

24. In a helicopter having an air frame, a lifting rotor, and a prime mover supported in the air frame and driving the rotor with a substantial unbalanced torque reaction, a jet reaction device for compensating the torque reaction of the lifting rotor on the air frame, said jet reaction device comprising a tubular member rigidly mounted on the air frame and having discharge means closely adjacent to the rotor disc including a plurality of jet reaction nozzles, controllable valve means for actuating said nozzles, and means for operating said valve means selectively for differential and independent operation of said nozzles.

CYRIL GEORGE PULLIN.

REFERENCES CITED

The following references are of record in the file of this patent:

UNITED STATES PATENTS

| Number | Name | Date |
|---|---|---|
| 1,854,043 | Korner | Apr. 12, 1932 |
| 1,922,167 | Leray | Aug. 15, 1933 |
| 2,092,077 | Knight et al. | Sept. 7, 1937 |
| 2,229,564 | Hagan | Jan. 21, 1941 |
| 2,252,528 | Sikorsky et al. | Aug. 12, 1941 |
| 2,317,340 | Bennett | Apr. 27, 1943 |
| 2,318,259 | Sikorsky | May 4, 1943 |
| 2,366,365 | Sorensen | Jan. 2, 1945 |
| 2,369,652 | Avery | Feb. 20, 1945 |

FOREIGN PATENTS

| Number | Country | Date |
|---|---|---|
| 669,687 | Germany | Jan. 2, 1939 |
| 687,482 | France | Apr. 28, 1930 |
| 818,703 | France | June 21, 1937 |

OTHER REFERENCES

Sikorsky, Article in "Journal of the Aeronautical Sciences," vol. 9, No. 8, June 1942, pages 309–311.

Certificate of Correction

Patent No. 2,503,172 — April 4, 1950

CYRIL GEORGE PULLIN

It is hereby certified that errors appear in the printed specification of the above numbered patent requiring correction as follows:

Column 6, line 21, for the words "on ring" read *or ring*; column 10, line 10, for "ject" read *jet*; column 14, line 41, for the claim reference numeral "15" read *16*; line 49, strike out "the" after "discharge" and insert same after "operating", same line; and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*